United States Patent
Zeng et al.

(10) Patent No.: US 11,848,624 B2
(45) Date of Patent: Dec. 19, 2023

(54) SINGLE VECTOR-BASED FINITE CONTROL SET MODEL PREDICTIVE CONTROL METHOD OF TWO PARALLEL POWER CONVERTERS

(71) Applicant: Nanjing University of Science and Technology, Nan Jing (CN)

(72) Inventors: Zhiyong Zeng, Nan Jing (CN); Li Yang, Nan Jing (CN); Zhen Cui, Nan Jing (CN); Xiaoliang Jin, Nan Jing (CN); Lei Li, Nan Jing (CN); Diming Zhang, Hangzhou (CN)

(73) Assignee: Nanjing University of Science and Technology, Nan Jing (CN)

( * ) Notice: Subject to any disclaimer, the term of this patent is extended or adjusted under 35 U.S.C. 154(b) by 0 days.

(21) Appl. No.: 18/127,061

(22) Filed: Mar. 28, 2023

(65) Prior Publication Data

US 2023/0344367 A1   Oct. 26, 2023

(30) Foreign Application Priority Data

Apr. 26, 2022  (CN) .......................... 202210443341.0

(51) Int. Cl.
*H02M 7/5387*   (2007.01)
*H02M 7/493*    (2007.01)

(52) U.S. Cl.
CPC ....... *H02M 7/53876* (2021.05); *H02M 7/493* (2013.01); *H02M 7/5387* (2013.01)

(58) Field of Classification Search
CPC ......... H02M 7/53871; H02M 7/53873; H02M 7/53875; H02M 7/53876; H02M 7/493
See application file for complete search history.

(56) References Cited

U.S. PATENT DOCUMENTS

2015/0171769 A1* 6/2015 Geyer .................. H02H 7/1227
                                                          363/71
2017/0227937 A1   8/2017 Batliner et al.
(Continued)

FOREIGN PATENT DOCUMENTS

CN     103036462 B  * 10/2014  ........ H02M 7/53875
CN     105870969 A  *  8/2016  ................ H02J 3/38
(Continued)

OTHER PUBLICATIONS

Chinese Office Action for Chinese Application No. 202210443341.0 dated Sep. 14, 2022 (5 pages).
(Continued)

*Primary Examiner* — Alex Torres-Rivera
(74) *Attorney, Agent, or Firm* — REISING ETHINGTON, P.C.

(57) ABSTRACT

This invention proposes a single-vector-based finite control set model predictive control for two parallel power converters, which adopts a centralized control structure to achieve accurate control of overall performance. It establishes predictive models for line currents and three phase-circulating currents and constructs a novel cost function that uses these currents as performance indices to implement the predictive control algorithm based on the proposed predictive models. The invention proposes dynamic weighting coefficients and adjustment principles to improve system control performance. A finite set output signal matrix containing important characteristic information of all alternative vectors is constructed to avoid redundant calculations in each control horizon, reducing computation time during practical implementation. This invention addresses the limitations of existing one-vector-based FCS-MPC for two paralleled power converters, which controls each sub-converter individually with a set of available eight control actions and cannot (Continued)

effectively regulate the overall performance of the two paralleled power converters.

10 Claims, 12 Drawing Sheets

(56) References Cited

U.S. PATENT DOCUMENTS

2019/0181775 A1* 6/2019 Geyer ................ H02M 7/5395
2020/0412271 A1   12/2020 Wu et al.

FOREIGN PATENT DOCUMENTS

| CN | 108258926 A | 7/2018 |
| CN | 110912431 A | 3/2020 |
| CN | 112019113 A | 12/2020 |
| CN | 113193766 A | 7/2021 |
| CN | 113809944 A | 12/2021 |
| CN | 113949298 A | 1/2022 |
| WO | WO2021114748 A1 | 6/2021 |

OTHER PUBLICATIONS

English Translation of Chinese Office Action for Chinese Application No. 202210443341.0 dated Sep. 14, 2022 (4 pages).
Chinese Notice of Allowance for Chinese Application No. 202210443341.0 dated Sep. 30, 2022 (2 pages).
English Translation of Chinese Notice of Allowance for Chinese Application No. 202210443341.0 dated Sep. 30, 2022 (2 pages).

* cited by examiner

SINGLE VECTOR-BASED FINITE CONTROL SET MODEL PREDICTIVE CONTROL METHOD OF TWO PARALLEL POWER CONVERTERS

CROSS-REFERENCE TO RELATED APPLICATIONS

This application is based upon and claims priority to Chinese Patent Application No. 202210443341.0, filed on Apr. 26, 2022, the entire contents of which are incorporated herein by reference.

TECHNICAL FIELD

The application belongs to the field of predictive control of two parallel power converters, in particular, relates to a single vector-based finite control set model predictive control method of two parallel power converters.

BACKGROUND

The demand for high power has led to the implementation of parallel power inverters in various applications such as high-power motor drives, grid-connected wind power generation, and uninterruptible power supplies, and the most commonly used topology is the two parallel converters, which has paralleled DC-links and paralleled AC terminals via filter inductors.

The line current quality, phase-circulating current between the parallel legs, and zero-sequence circulating current significantly impact the performance of the two parallel converters. The line current is affected by voltage vector errors between the instantaneous output and reference voltages, and optimizing the switch states helps minimize these errors and improve the line current. The phase-circulating current is introduced by differences in switch states between the parallel legs and can be eliminated by synchronizing these switch states. The zero-sequence circulating current, which is the sum of the three phase-circulating currents, depends on the switch states of the two parallel converters.

The optimal performance of those critical indicators in two parallel converters depends on the switch states of the two parallel converters, such as line current, phase-circulating current between parallel legs, and zero-sequence circulating current. However, each indicator requires different switch states for optimal performance, making it difficult for two parallel converters to optimize all indicators simultaneously. Given it, multi-objective optimization should be sought to enhance the overall performance of the two parallel inverters. However, conventional pulse width modulation (PWM) strategies cannot achieve multi-objective optimization.

The finite control set model predictive control (FCS-MPC) is an ideal solution for multi-objective optimization, with benefits such as straightforward principles, robustness to parameter variations, and quick dynamic response. FCS-MPC defines a cost function that optimizes critical indicators and selects the optimal solution from a finite set in each control horizon. As a result, FCS-MPC can comprehensively optimize critical indicators, making it an effective tool for the overall performance control in two parallel converters.

Existing methods for single-vector-based FCS-MPC in two parallel converters employ a two-stage prediction approach. In each control horizon, only one stage is active to determine control actions. The first stage optimizes the line current, selecting optimal control actions from a set of eight available control actions. The second stage only activates if the zero-sequence circulating current exceeds limits and determines the control action to suppress the circulating current dominantly. However, this two-stage FCS-MPC ignores the complete set of 64 switching states available with two parallel converters, limiting the optimization options. As a result, existing methods cannot effectively control both line and circulating currents.

This invention aims to comprehensively optimize the phase-circulating current, line current, and zero-sequence circulating current. It builds finite control set models for the line current and phase-circulating current of the two parallel power converters and establishes a mapping relationship between the key indicators and switch combinations (single vectors). Then, a novel cost function is constructed to select the optimal control action from the complete set of 64 available control actions introduced by the two parallel converters. The cost function also includes weight factors to prioritize performance optimization, with different weight factor settings for various optimization needs. A finite set output signal matrix is also constructed to avoid redundant calculations in each control horizon, reducing computation time in practical implementation. This invention resolves the issue with existing one vector-based finite control set model predictive control (FCS-MPC) for two paralleled power converters, which control each sub-converter individually with a set of available eight control actions and cannot effectively regulate the overall performance of the two paralleled power converters. The experimental results confirm the effectiveness of the proposed one vector-based FCS-MPC for two paralleled power converters. This invention is highly significant.

SUMMARY

This application proposes a single vector-based finite control set model predictive control (FCS-MPC) method for two parallel power converters. The method comprehensively optimizes both the line currents and circulating currents of the parallel converters, resulting in the improved overall performance while reducing computation time in each control horizon.

This application proposes a single vector-based finite control set model predictive control method for two parallel power converters, which comprises the following steps:

Step (1): establishing mathematical models of line currents and three phase-circulating currents for the two parallel power converters respectively, and obtaining discrete predictive models by discretization Step (2): establishing relationships between switching states and equivalent output terminal voltage differences, generating a complete set of 64 alternative vector combinations available with the two parallel converters, and creating a 64×12 finite set output signal matrix that comprises key characteristic information, such as the switching states, equivalent output voltages, and terminal voltage differences.

Step (3): in this step, the following measurements are taken at instant k: the DC bus voltage $V_{DC}(k)$, load voltages $e_a(k)$, $e_b(k)$ and $e_c(k)$, three-phase currents $i_{a1}(k)$, $i_{b1}(k)$ and $i_{c1}(k)$ of the first converter and three-phase currents $i_{a2}(k)$, $i_{b2}(k)$ and $i_{c2}(k)$ of the second converter. The line currents $i_a(k)$, $i_b(k)$ and $i_c(k)$ and three phase-circulating currents $i_{cira}(k)$, $i_{cirb}(k)$ and $i_{circ}(k)$ are obtained on these measurements. Besides, reference values of line currents $i_{ra}(k+2)$, $i_{rb}(k+2)$ and $i_{rc}(k+2)$ at the instant k+2 are calculated, and the reference values of the three phase-circulating currents are set to 0.

Step (4) involves two-step prediction to account for time delay and grouping of 64 alternative vector combinations to reduce redundant calculations. First, the discrete predictive models established in Step (1) are used to calculate predictive values of line currents and three phase-circulating currents at instant k+1, using the load voltages, line currents, and three phase-circulating currents at instant k and the output voltages and terminal voltage differences determined by the preselection vector at instant k−1. Second, the 64 alternative vector combinations are classified according to the output signal matrix from Step (2), and the equivalent output voltages and terminal voltage differences of the classified vector combinations are substituted into the discrete predictive models to calculate predictive values of line currents and three phase-circulating currents at instant k+2.

Step (5) involves creating a cost function using the line currents and three phase-circulating currents as performance indices. The relationship between the fluctuation amplitude of the three phase-circulating currents and line current ripple is analyzed, and dynamic weight coefficients are set for the cost function. Then, the predictive line currents and three phase-circulating currents of the classified vector combinations at the instant k+2 are used to calculate the cost function value. Finally, the optimal vector combination that minimizes the cost is obtained.

Step (6) involves generating switching signals of the first converter and second converter (CNV1 and CNV2) based on the switching states of the optimal vector combination obtained in Step (5). The switching signals are then amplified to control the power switching devices of two parallel converters. It should be noted that due to time delay, the switching signals will take effect at the instant k+1.

Further, various models in Step (1) are specified as follows:

The mathematical model of the line currents is:

$$\begin{cases} L_e \dfrac{di_a}{dt} = u_a - e_a - R_e i_a \\ L_e \dfrac{di_b}{dt} = u_b - e_b - R_e i_b \\ L_e \dfrac{di_c}{dt} = u_c - e_c - R_e i_c \end{cases} \quad (1)$$

In Equation (1), the equivalent inductance and its parasitic resistance are represented by $L_e$ and $R_e$, respectively, where $L_e$ is calculated as $L+L_1/2$ and $R_e$ is calculated as $R+R_1/2$. The discrete predictive model of the line currents is obtained as:

$$\begin{cases} i_a(k+1) = \dfrac{T_s}{L_e}[u_a(k) - e_a(k) - R_e i_a(k)] + i_a(k) \\ i_b(k+1) = \dfrac{T_s}{L_e}[u_b(k) - e_b(k) - R_e i_b(k)] + i_b(k) \\ i_c(k+1) = \dfrac{T_s}{L_e}[u_c(k) - e_c(k) - R_e i_c(k)] + i_c(k) \end{cases} \quad (2)$$

where $i_a(k)$, $i_b(k)$ and $i_c(k)$ are the sampled values of line currents at the instant k. $i_a(k+1)$, $i_b(k+1)$ and $i_c(k+1)$ are the predictive values of line currents at the instant k+1. $u_a(k)$, $u_b(k)$ and $u_c(k)$ are the sampled values of equivalent output voltages at the instant k.

The mathematical model of the three phase-circulating currents is derived as:

$$\begin{cases} L_1 \dfrac{di_{cira}}{dt} + R_1 i_{cira} = u_{a1o} - u_{a2o} = \Delta u_a \\ L_1 \dfrac{di_{cirb}}{dt} + R_1 i_{cirb} = u_{b1o} - u_{b2o} = \Delta u_b \\ L_1 \dfrac{di_{circ}}{dt} + R_1 i_{circ} = u_{c1o} - u_{c2o} = \Delta u_c \end{cases} \quad (3)$$

where $u_{a1o}$, $u_{b1o}$, $u_{c1o}$, $u_{a2o}$, $u_{b2o}$, and $u_{c2o}$ represent the voltage from the midpoint of each leg to the virtual midpoint of the DC bus, while $\Delta u_a$, $\Delta u_b$, $\Delta u_c$ indicate the terminal voltage differences between the parallel legs. The discrete predictive model of the line currents is obtained as:

$$\begin{cases} i_{cira}(k+1) = \dfrac{T_s}{L_1}[\Delta u_a(k) - R_1 i_{cira}(k)] + i_{cira}(k) \\ i_{cirb}(k+1) = \dfrac{T_s}{L_1}[\Delta u_b(k) - R_1 i_{cirb}(k)] + i_{cirb}(k) \\ i_{circ}(k+1) = \dfrac{T_s}{L_1}[\Delta u_c(k) - R_1 i_{circ}(k)] + i_{circ}(k) \end{cases} \quad (4)$$

where $i_{cira}(k)$, $i_{cirb}(k)$ and $i_{circ}(k)$ are the three phase-circulating currents at the instant k, $i_{cira}(k+1)$, $i_{cirb}(k+1)$ and $i_{circ}(k+1)$ are predictive three phase-circulating currents at the instant k+1, and $\Delta u_a(k)$, $\Delta u_b(k)$ and $\Delta u_c(k)$ represent the terminal voltage differences between the parallel legs at the instant k, respectively.

Further, Step (2) is specified as follows:

The expression of the equivalent output voltages of the two parallel power converters in Step (2) is:

$$\begin{cases} u_a = \dfrac{2(S_{a1} + S_{a2}) - (S_{b1} + S_{b2}) - (S_{c1} + S_{c2})}{6} V_{DC} \\ u_b = \dfrac{2(S_{b1} + S_{b2}) - (S_{a1} + S_{a2}) - (S_{c1} + S_{c2})}{6} V_{DC} \\ u_c = \dfrac{2(S_{c1} + S_{c2}) - (S_{a1} + S_{a2}) - (S_{b1} + S_{b2})}{6} V_{DC} \end{cases} \quad (5)$$

In Equation (5), the state function values $S_{a1}$, $S_{b1}$, $S_{c1}$, $S_{a2}$, $S_{b2}$, and $S_{c2}$ represent the ON/OFF status of the IGBTs of the two parallel power converters, with a value of 1 indicating that the upper IGBT is on and the lower IGBT is off, and vice versa.

The terminal voltage differences of two parallel power converters in Step (2) are:

$$\begin{cases} \Delta u_a = (S_{a1} - S_{a2}) V_{DC} \\ \Delta u_b = (S_{b1} - S_{b2}) V_{DC} \\ \Delta u_c = (S_{c1} - S_{c2}) V_{DC} \end{cases} \quad (6)$$

Each row of the output signal matrix in Step (2) contains key information for every alternative vector combination, such as the switching states, equivalent output voltages, and terminal voltage differences, and can be expressed as $[S_{a1}\ S_{b1}\ S_{c1}\ S_{a2}\ S_{b2}\ S_{c2}\ u_a\ u_b\ u_c\ \Delta u_a\ \Delta u_b\ \Delta u_c]$.

Further, the line currents $i_a(k)$, $i_b(k)$ and $i_c(k)$ and the three phase-circulating currents $i_{cira}(k)$, $i_{cirb}(k)$ and $i_{circ}(k)$ are:

$$\begin{cases} i_a(k) = i_{a1}(k) + i_{a2}(k) \\ i_b(k) = i_{b1}(k) + i_{b2}(k) \\ i_c(k) = i_{c1}(k) + i_{c2}(k) \end{cases} \quad (7)$$

$$\begin{cases} i_{cira}(k) = i_{a1}(k) - i_{a2}(k) \\ i_{cirb}(k) = i_{b1}(k) - i_{b2}(k) \\ i_{circ}(k) = i_{c1}(k) - i_{c2}(k) \end{cases} \quad (8)$$

where $i_{a1}(k)$, $i_{b1}(k)$, $i_{c1}(k)$, $i_{a2}(k)$, $i_{b2}(k)$ and $i_{c2}(k)$ are, respectively, three-phase currents of the two sub-converters at the instant k.

The reference values of the line currents $i_{ra}(k+2)$, $i_{rb}(k+2)$ and $i_{rc}(k+2)$ at the instant k+2 are:

$$\begin{cases} i_{ra}(k+2) = 3i_{ra}(k+1) - 3i_{ra}(k) + i_{ra}(k-1) \\ i_{rb}(k+2) = 3i_{rb}(k+1) - 3i_{rb}(k) + i_{rb}(k-1) \\ i_{rc}(k+2) = 3i_{rc}(k+1) - 3i_{rc}(k) + i_{rc}(k-1) \end{cases} \quad (9)$$

where $i_{ra}(k+1)$, $i_{rb}(k+1)$ and $i_{rc}(k+1)$ are the reference values of line currents at the instant k+1. $i_{ra}(k)$, $i_{rb}(k)$ and $i_{rc}(k)$ are the reference values of line currents at the instant k. $i_{ra}(k-1)$, $i_{rb}(k-1)$ and $i_{rc}(k-1)$ are the reference values of line currents at the instant k−1.

Furthermore, in order to avoid redundant calculations, the method in step (4) classifies alternative vector combinations as follows:

In the 64 alternative vector combinations of the two parallel power converters, vector combinations with equivalent output voltages or terminal voltage differences are grouped together to reduce computation time. For instance, the vector combinations (100, 000) and (110, 101) with the same output voltage are classified into one group, reducing the computation time of the predictive line currents. Similarly, the vector combinations (100, 000) and (110, 010) with the same terminal voltage difference are also classified into one group, reducing the computation time of the predictive circulating currents. Besides, each phase output voltage is classified into five groups: $2V_{DC}/3$, $V_{DC}/3$, 0, $-V_{DC}/3$, and $-2V_{DC}/3$, thereby reducing the computation time of the predictive line current from 64 to 5 groups. Likewise, the terminal voltage differences are classified into three groups: $V_{DC}$, 0, and $-V_{DC}$, thus reducing the computation time of the predictive circulating current from 64 to 3 groups.

Based on the discrete predictive models, the predictive values at the instant k+2 are:

$$\begin{cases} i_a(k+2) = \frac{T_s}{L_e}[u_a(k+1) - e_a(k+1) - R_e i_a(k+1)] + i_a(k+1) \\ i_b(k+2) = \frac{T_s}{L_e}[u_b(k+1) - e_b(k+1) - R_e i_b(k+1)] + i_b(k+1) \\ i_c(k+2) = \frac{T_s}{L_e}[u_c(k+1) - e_c(k+1) - R_e i_c(k+1)] + i_c(k+1) \end{cases} \quad (10)$$

$$\begin{cases} i_{cira}(k+2) = \frac{T_s}{L_1}[\Delta u_a(k+1) - R_1 i_{cira}(k+1)] + i_{cira}(k+1) \\ i_{cirb}(k+2) = \frac{T_s}{L_1}[\Delta u_b(k+1) - R_1 i_{cirb}(k+1)] + i_{cirb}(k+1) \\ i_{circ}(k+2) = \frac{T_s}{L_1}[\Delta u_c(k+1) - R_1 i_{circ}(k+1)] + i_{circ}(k+1) \end{cases} \quad (11)$$

Further, the cost function and dynamic weight coefficients in Step (5) are:

$$g = \sum_{x=a,b,c}(i_{cirx}(k+2))^2 + \frac{1}{\lambda^2}\frac{\gamma}{1-\gamma}\left(\frac{L_e}{L_1}\right)^2 \sum_{x=a,b,c}(i_x(k+2) - i_{rx}(k+2))^2 \quad (12)$$

$\lambda$ is a distribution coefficient that determines the relative importance of controlling the three phase-circulating currents and lines current ripples, given by $\lambda$=Max [M, (4/3)−M]; M ($=2U_m/V_{DC}$) is the modulation index; Urn is the amplitude of the reference voltage; $\gamma \in [0, 1]$ is a variable parameter (dynamic weight coefficient) for further improving the control performance. A value of $\gamma$=0.5 balances the output performance of the three phase-circulating currents and the line current ripples. For applications that prioritize line current quality, $\gamma$ can be increased; for those that prioritize circulating current, $\gamma$ can be decreased.

The optimal vector combination is determined by calculating and comparing the cost function values of 64 alternative vector combinations, with the one having the lowest value being selected. The gate signals of power switching devices of two parallel converters are then generated based on this optimal vector combination.

Compared with the prior art, the application has the following beneficial effects:

(1) Existing one-vector-based FCS-MPC individually controls each sub-converter with a set of eight control actions and thus cannot effectively regulate the overall performance of line current and circulating current in the two paralleled power converters. Considering that, this invention presents a single vector-based FCS-MPC for two parallel power converters to optimize the overall performance of line current and circulating current. The proposed method involves building finite control set models and establishing a mapping relationship between the key indicators and switch combinations (single vectors). The predictive control algorithm is then implemented using a novel cost function that considers the line current and phase-circulating current as performance indicators. The proposed cost functions can accurately select the optimal control actions from a set of 64 control actions available from two parallel converters, maximizing the optimization options. The proposed one-vector-based FCS-MPC can effectively control the overall performance of line current and phase-circulating current in the two parallel inverters.

(2) the application analyzed the relationship between the fluctuation amplitude of the three phase-circulating currents and that of the line current ripples and used that information to determine the corresponding adjustment principles of the distribution coefficient. Furthermore, this application proposed the dynamic weight coefficient to improve the comprehensive performance of the two parallel power converters;

(3) this application constructs a finite control set output signal matrix that contains important characteristic information of all alternative vector combinations. This application classified the alternative vectors into different groups to reduce the computation time. Besides, this application also considered the delay compensation to enhance the control effects of the system.

BRIEF DESCRIPTION OF THE DRAWINGS

FIG. 4 (b) is an absolute value distribution diagram of the maximum voltage vector error in the first sector.

FIG. 6 (b) shows the experimental results of the three phase-circulating current at γ=0.2.

FIG. 7 (b) shows the experimental results of the three phase-circulating current at γ=0.5.

FIG. 8 (b) shows the experimental results of the three phase-circulating current at γ=0.8.

DETAILED DESCRIPTION

The specific embodiments of the present application are described in detail below in combination with the drawings.

Figure 1:
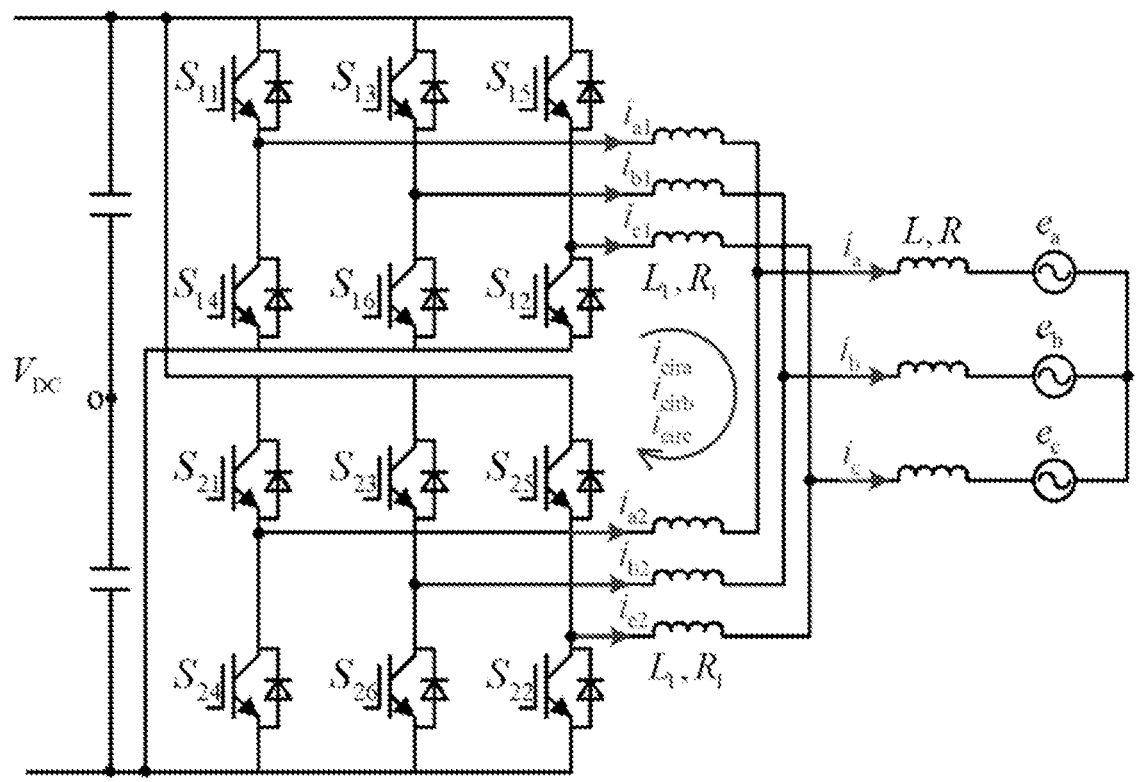
FIG. 1 is a topology diagram of two parallel power converters.

FIG. 1 depicts the configuration of two parallel power converters, where CNV1 and CNV2 are two-level converters with paralleled DC links and AC terminals connected via filter inductors. The three-phase currents of the first converter are represented by $i_{a1}$, $i_{b1}$ and $i_{c1}$, while $i_{a2}$, $i_{b2}$ and $i_{c2}$ denote those of the second converter. The line currents are represented by $i_a$, $i_b$ and $i_c$, while the three phase-circulating currents are denoted by $i_{cira}$, $i_{cirb}$ and $i_{circ}$. AC side powers/load voltages are represented by $e_a$, $e_b$ and $e_c$, DC bus voltage is represented by $V_{DC}$, and AC side inductance and its parasitic resistance are represented by L and R, respectively. Similarly, $L_1$ and $R_1$ represent the filter inductance and its parasitic resistance, respectively, while $S_{11}$ to $S_{26}$ represent all the power switching devices of the two converters. The line currents of two parallel converters and the three-phase-circulating currents are obtained as per Kirchhoff's current law.

$$\begin{cases} i_a = i_{a1} + i_{a2} \\ i_b = i_{b1} + i_{b2} \\ i_c = i_{c1} + i_{c2} \end{cases}, \begin{cases} i_{cira} = i_{a1} - i_{a2} \\ i_{cirb} = i_{b1} - i_{b2} \\ i_{circ} = i_{c1} - i_{c2} \end{cases} \tag{1}$$

Figure 2:
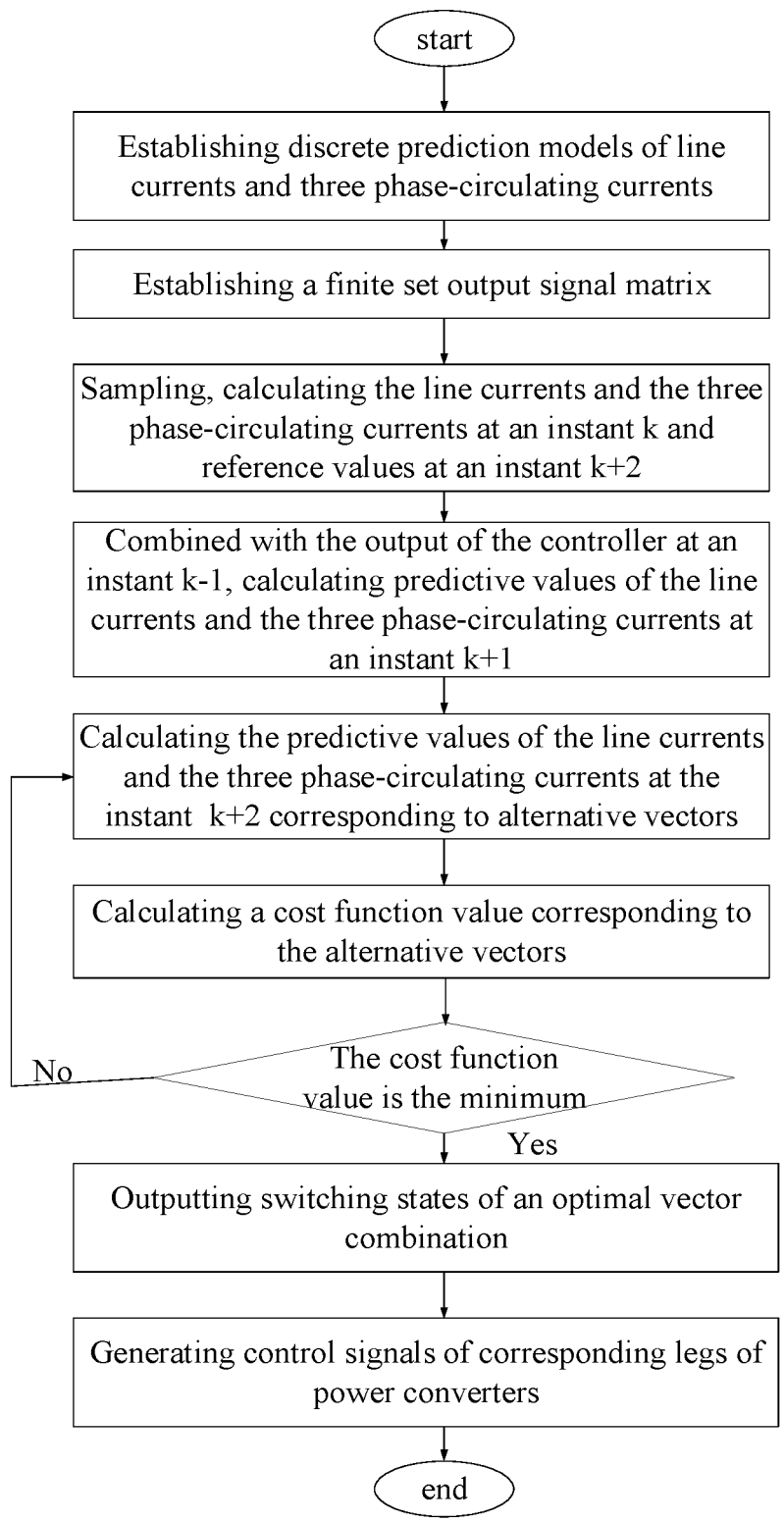
FIG. 2 is a flow chart of a single vector-based finite control set model predictive control method provided by the application.

As shown in FIG. 2, the specific implementation steps of a single vector-based finite control set model predictive control method are as follows:

Step (1): establishing mathematical models of line currents and three phase-circulating currents for the two parallel power converters respectively, and obtaining discrete predictive models by discretization.

According to Kirchhoff's laws, the mathematical model of the line currents is derived:

$$\begin{cases} L_e \dfrac{di_a}{dt} = u_a - e_a - R_e i_a \\ L_e \dfrac{di_b}{dt} = u_b - e_b - R_e i_b \\ L_e \dfrac{di_c}{dt} = u_c - e_c - R_e i_c \end{cases} \tag{2}$$

In Equation (2), the equivalent inductance and its parasitic resistance are represented by $L_e$ and $R_e$, respectively, where $L_e$ is calculated as $L+L_1/2$ and $R_e$ is calculated as $R+R_1/2$. The discrete predictive model of the line currents is obtained as:

$$\begin{cases} i_a(k+1) = \dfrac{T_s}{L_e}[u_a(k) - e_a(k) - R_e i_a(k)] + i_a(k) \\ i_b(k+1) = \dfrac{T_s}{L_e}[u_b(k) - e_b(k) - R_e i_b(k)] + i_b(k) \\ i_c(k+1) = \dfrac{T_s}{L_e}[u_c(k) - e_c(k) - R_e i_c(k)] + i_c(k) \end{cases} \tag{3}$$

The mathematical model of the three phase-circulating currents is derived as:

$$\begin{cases} L_1 \dfrac{di_{cira}}{dt} + R_1 i_{cira} = u_{a1o} - u_{a2o} = \Delta u_a \\ L_1 \dfrac{di_{cirb}}{dt} + R_1 i_{cirb} = u_{b1o} - u_{b2o} = \Delta u_b \\ L_1 \dfrac{di_{circ}}{dt} + R_1 i_{circ} = u_{c1o} - u_{c2o} = \Delta u_c \end{cases} \tag{4}$$

where $u_{a1o}$, $u_{b1o}$, $u_{c1o}$, $u_{a2o}$, $u_{b2o}$, and $u_{c2o}$ represent the voltage from the midpoint of each leg to the virtual midpoint of the DC bus, while $\Delta u_a$, $\Delta u_b$, $\Delta u_c$ indicate the terminal voltage differences between the parallel legs. The discrete predictive model of the line currents is obtained as:

$$\begin{cases} i_{cira}(k+1) = \dfrac{T_s}{L_1}[\Delta u_a(k) - R_1 i_{cira}(k)] + i_{cira}(k) \\ i_{cirb}(k+1) = \dfrac{T_s}{L_1}[\Delta u_b(k) - R_1 i_{cirb}(k)] + i_{cirb}(k) \\ i_{circ}(k+1) = \dfrac{T_s}{L_1}[\Delta u_c(k) - R_1 i_{circ}(k)] + i_{circ}(k) \end{cases} \tag{5}$$

Step (2): establishing relationships between switching states and equivalent output terminal voltage differences of the two parallel power converters, generating a complete set of 64 alternative vector combinations available with the two parallel converters, and creating a 64×12 finite set output signal matrix that comprises characteristic information covering switching states, equivalent output voltages, and terminal voltage differences.

Firstly, the expression of the equivalent output voltages of two parallel converters is derived as:

$$\begin{cases} u_a = \dfrac{2(S_{a1} + S_{a2}) - (S_{b1} + S_{b2}) - (S_{c1} + S_{c2})}{6} V_{DC} \\ u_b = \dfrac{2(S_{b1} + S_{b2}) - (S_{a1} + S_{a2}) - (S_{c1} + S_{c2})}{6} V_{DC} \\ u_c = \dfrac{2(S_{c1} + S_{c2}) - (S_{a1} + S_{a2}) - (S_{b1} + S_{b2})}{6} V_{DC} \end{cases} \tag{6}$$

In Equation (6), the state function values $S_{a1}$, $S_{b1}$, $S_{c1}$, $S_{a2}$, $S_{b2}$, and $S_{c2}$ represent the ON/OFF status of the IGBTs of the two parallel power converters, with a value of 1 indicating that the upper IGBT is on and the lower IGBT is off, and vice versa.

Secondly, the expression of the terminal voltage differences of two parallel power converters is derived as:

$$\begin{cases} \Delta u_a = (S_{a1} - S_{a2})V_{DC} \\ \Delta u_b = (S_{b1} - S_{b2})V_{DC} \\ \Delta u_c = (S_{c1} - S_{c2})V_{DC} \end{cases} \quad (7)$$

An output signal matrix for two parallel power converters is established based on equations (6) and (7), with each row consisting of switching states, equivalent output voltages, and terminal voltage differences, represented by $[S_{a1}\ S_{b1}\ S_{c1}\ S_{a2}\ S_{b2}\ S_{c2}\ u_a\ u_b\ u_c\ \Delta u_a\ \Delta u_b\ \Delta u_c]$. With 64 available switching states combinations, the matrix has 64 rows×12 columns, and subsequent predictive processes will reference this matrix for corresponding feature information.

Step (3): sampling a DC bus voltage $V_{DC}(k)$, load voltages $e_a(k)$, $e_b(k)$ and $e_c(k)$, three-phase currents of the first converter $i_{a1}(k)$, $i_{b1}(k)$ and $i_{c1}(k)$ and three-phase currents of the second converter $i_{a2}(k)$, $i_{b2}(k)$ and $i_{c2}(k)$ at an instant k, determining the line currents $i_a(k)$, $i_b(k)$ and $i_c(k)$ and the three phase-circulating currents $i_{cira}(k)$, $i_{cirb}(k)$ and $i_{circ}(k)$ according to the three-phase currents of the two parallel power converters, and calculating reference values of the line currents $i_{ra}(k+2)$, $i_{rb}(k+2)$ and $i_{rc}(k+2)$ at an instant k+2, while setting the reference values of the three phase-circulating currents to zero.

According to equation (1), the sampling values of the line currents and the three phase-circulating currents can be obtained as:

$$\begin{cases} i_a(k) = i_{a1}(k) + i_{a2}(k) \\ i_b(k) = i_{b1}(k) + i_{b2}(k), \\ i_c(k) = i_{c1}(k) + i_{c2}(k) \end{cases} \begin{cases} i_{cira}(k) = i_{a1}(k) - i_{a2}(k) \\ i_{cirb}(k) = i_{b1}(k) - i_{b2}(k) \\ i_{circ}(k) = i_{c1}(k) - i_{c2}(k) \end{cases} \quad (8)$$

Step (4): adding delay compensation, using a two-step prediction approach, classifying the 64 alternative vector combinations of the two parallel power converters, substituting the equivalent output voltages and the terminal voltage differences in the finite set output signal matrix into the discrete predictive models by category, and generating predictive values of the line currents and the three phase-circulating currents at the instant k+2.

To account for the time delay in the microprocessor, a two-step prediction is implemented in the proposed single vector-based finite control set model predictive control method. Firstly, predictive values for line currents $[i_a(k+1), i_b(k+1)$ and $i_c(k+1)]$ and three phase-circulating currents $[i_{cira}(k+1), i_{cirb}(k+1)$ and $i_{circ}(k+1)]$ at the instant k+1 are calculated by inputting the preselection vector from the instant k−1 into equations (3) and (5). Next, predictive values for line currents $[i_a(k+2), i_b(k+2)$ and $i_c(k+2)]$ and three phase-circulating currents $[i_{cira}(k+2), i_{cirb}(k+2)$ and $i_{circ}(k+2)]$ at the instant k+2 are calculated by substituting the 64 alternative vector combinations into equation (3) and (5). This eliminates the time delay between selecting a vector combination at instant k and the corresponding action at instant k+1.

$$\begin{cases} i_a(k+2) = \frac{T_s}{L_e}[u_a(k+1) - e_a(k+1) - R_e i_a(k+1)] + i_a(k+1) \\ i_b(k+2) = \frac{T_s}{L_e}[u_b(k+1) - e_b(k+1) - R_e i_b(k+1)] + i_b(k+1) \\ i_c(k+2) = \frac{T_s}{L_e}[u_c(k+1) - e_c(k+1) - R_e i_c(k+1)] + i_c(k+1) \end{cases} \quad (9)$$

-continued $$\begin{cases} i_{cira}(k+2) = \frac{T_s}{L_1}[\Delta u_a(k+1) - R_1 i_{cira}(k+1)] + i_{cira}(k+1) \\ i_{cirb}(k+2) = \frac{T_s}{L_1}[\Delta u_b(k+1) - R_1 i_{cirb}(k+1)] + i_{cirb}(k+1) \\ i_{circ}(k+2) = \frac{T_s}{L_1}[\Delta u_c(k+1) - R_1 i_{circ}(k+1)] + i_{circ}(k+1) \end{cases} \quad (10)$$

In order to ensure control performance and system stability, the computation time should be minimized to prevent exceeding the control cycle. In the 64 alternative vector combinations of the two parallel power converters, vector combinations with equivalent output voltages or terminal voltage differences are grouped together to reduce computation time. The same group of vector combinations is calculated only once to reduce computation time. For instance, the vector combinations (100, 000) and (110, 101) with the same output voltage are classified into one group, reducing the computation time of the predictive line currents. Similarly, the vector combinations (100, 000) and (110, 010) with the same terminal voltage difference are also classified into one group, reducing the computation time of the predictive circulating currents. Besides, each phase output voltage is classified into five groups: $2V_{DC}/3$, $V_{DC}/3$, 0, $-V_{DC}/3$, and $-2V_{DC}/3$, thereby reducing the computation time of the predictive line current from 64 to 5 groups. Likewise, the terminal voltage differences are classified into three groups: $V_{DC}$, 0, and $-V_{DC}$, thus reducing the computation time of the predictive circulating current from 64 to 3 groups.

Step (5): creating a cost function using the line currents and the three phase-circulating currents as performance indices, substituting the reference values of the line currents and the predictive values of the line currents and the three phase-circulating currents of the alternative vector combinations at the instant k+2 to obtain a cost function value and obtaining an optimal vector combination that minimizes the cost function through comparison.

Figure 3:
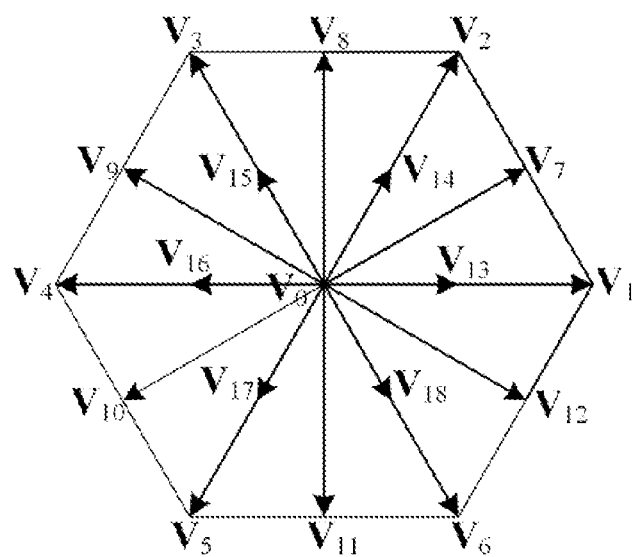
FIG. 3 is a space vector diagram of two parallel power converters.

FIG. 3 depicts that 19 basic vectors are formed using 64 vector combinations, including 1 zero vector ($V_0$), 6 long vectors ($V_1$~$V_6$), 6 medium vectors ($V_7$~$V_{12}$), and 6 short vectors ($V_{13}$~$V_{18}$). The traditional two-stage FCS-MPC ignores the complete set of 64 switching states available with two parallel converters, limiting the optimization options. As a result, existing methods cannot effectively control both line and circulating currents. This invention aims to comprehensively optimize the phase-circulating current, line current, and zero-sequence circulating current. It builds finite control set models for the line current and phase-circulating current of the two parallel power converters and establishes a mapping relationship between the key indicators and switch combinations (single vectors). Besides, to ensure the capability of adjusting the single-phase circulating currents, it is necessary to enable the asynchronous switching states of the two parallel power converters. Given it, the maximum single-phase circulating current $I_{cirmax}$ is:

$$I_{cirmax} = \frac{V_{DC}T_s}{2L_1} \quad (11)$$

The voltage vector errors are the main factor in determining the three-phase current ripples of two parallel power converters.

$$\begin{cases} i_{ripa} = i_a - i_{ra} = \dfrac{u_a - u_{ra}}{L_e} T_s \\ i_{ripb} = i_b - i_{rb} = \dfrac{u_b - u_{rb}}{L_e} T_s \\ i_{ripc} = i_c - i_{rc} = \dfrac{u_c - u_{rc}}{L_e} T_s \end{cases} \quad (12)$$

The maximum current ripple $I_{ripmax}$ is:

$$I_{ripmax} = \frac{T_s}{L_e} \times \max(u_a - u_{ra},\ u_b - u_{rb},\ u_c - u_{rc}) \quad (13)$$

Figure 4A:
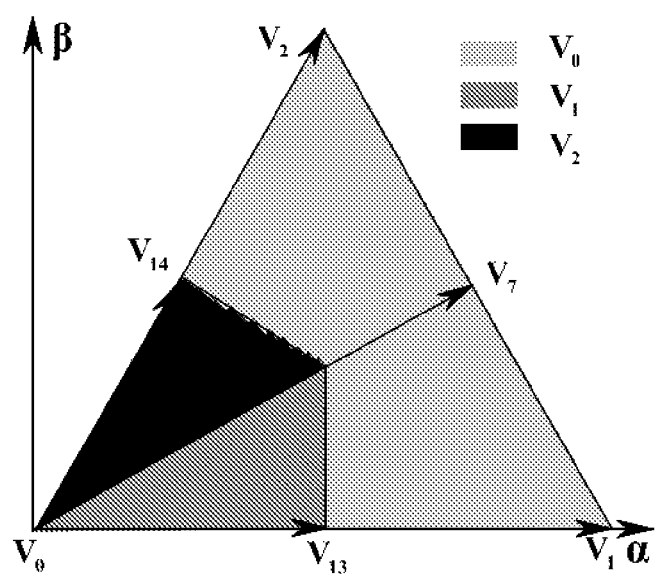
FIG. 4 (a) is a vector distribution diagram with maximum voltage error in the first sector.
Figure 4B:
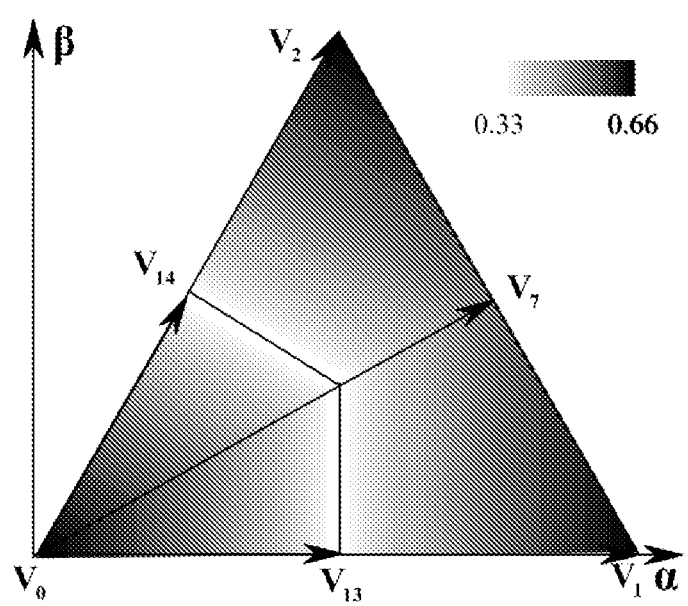

The use of interleaved carriers results in varying maximum voltage vector errors depending on the modulation index. In the first sector (0~60°, FIG. 4(a) shows the maximum voltage error vector in different areas, and FIG. 4(b) shows the distribution of the absolute value of the maximum voltage vector error. The modulation index M is defined as $M=2U_m/V_{DC}$, where $U_m$ is the reference voltage amplitude. When M is less than 2/3, the maximum voltage vector error decreases gradually as M increases; otherwise, the maximum voltage vector error increases with increasing M.

According to FIG. 4, the maximum value of the line current ripples is:

$$I_{ripmax} = \begin{cases} \dfrac{V_{DC}T_s}{2L_e}\left(\dfrac{4}{3} - M\right) & M \in \left[0, \dfrac{2}{3}\right) \\ \dfrac{V_{DC}T_s}{2L_e} M & M \in \left[\dfrac{2}{3}, \dfrac{4}{3}\right] \end{cases} \quad (14)$$

where $$\lambda = \max\left(M, \frac{4}{3} - M\right),$$

equation can be simplified as:

$$I_{ripmax} = \frac{\lambda V_{DC} T_s}{2 L_e} \quad (15)$$

The cost function is defined as the optimization of three phase-circulating currents and line current ripples, based on equations (11) and (15).

$$g = \sum_{x=a,b,c} (i_{cirx}(k+2))^2 + \frac{1}{\lambda^2}\left(\frac{L_e}{L_1}\right)^2 \sum_{x=a,b,c} (i_x(k+2) - i_{rx}(k+2))^2 \quad (16)$$

where $\lambda$ represents a distribution coefficient that adjusts the proportion of the two control objectives, three phase-circulating currents and line currents, in the cost function under different modulation indices to ensure control performance.

The cost function is modified to meet the requirements of different application scenarios:

$$g = \sum_{x=a,b,c} (i_{cirx}(k+2))^2 + \frac{1}{\lambda^2}\frac{\gamma}{1-\gamma}\left(\frac{L_e}{L_1}\right)^2 \sum_{x=a,b,c} (i_x(k+2) - i_{rx}(k+2))^2 \quad (17)$$

where $\gamma \in [0, 1]$ is a variable parameter for further improving the control performance. A value of $\gamma=0.5$ balances the output performance of the three phase-circulating currents and the line current ripples. For applications that prioritize line current quality, $\gamma$ can be increased; for those that prioritize circulating current, $\gamma$ can be decreased.

The optimal vector combination is determined by calculating and comparing the cost function values of 64 alternative vector combinations, with the one having the lowest value being selected. The gate signals of power switching devices of two parallel converters are then generated based on this optimal vector combination.

Step (6): generating switching control signals of corresponding legs of the two parallel power converters (CNV1 and CNV2) through a comparator using switching states of the optimal vector combination and amplifying the switching control signals to control power switching devices of the two parallel power converters. It should be noted that due to time delay, the switching control signals will take effect at the instant k+1.

Figure 5:
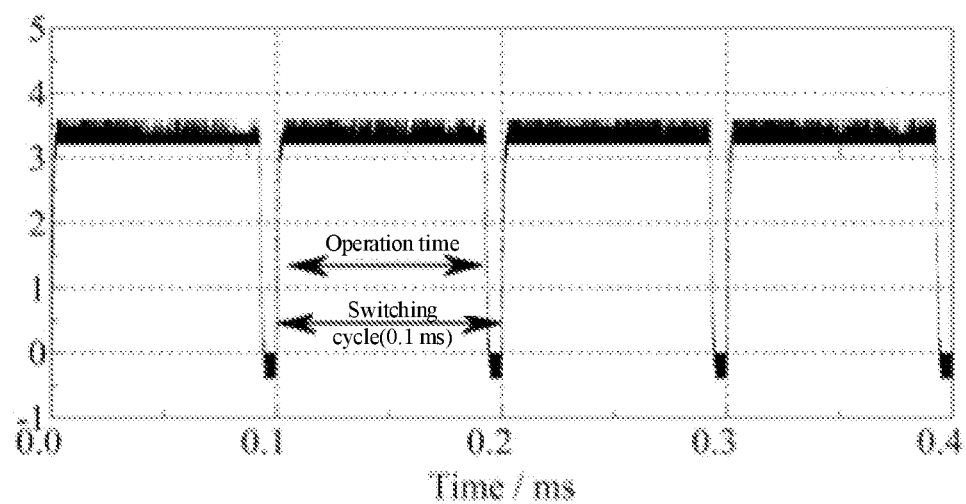
FIG. 5 is an operation duration diagram of the model predictive control algorithm by the application.

An experimental prototype was built to test the proposed method, with a DC voltage of 200V, an AC-side resistance load of 9Ω, a filter inductance of 14.4 mH, a switching frequency of 10 kHz, a fundamental frequency of 50 Hz, and a modulation index of 0.8. According to FIG. 5, the operation time of the proposed model predictive control algorithm is less than 0.1 ms, which is the same as the switching period.

Figure 6A:
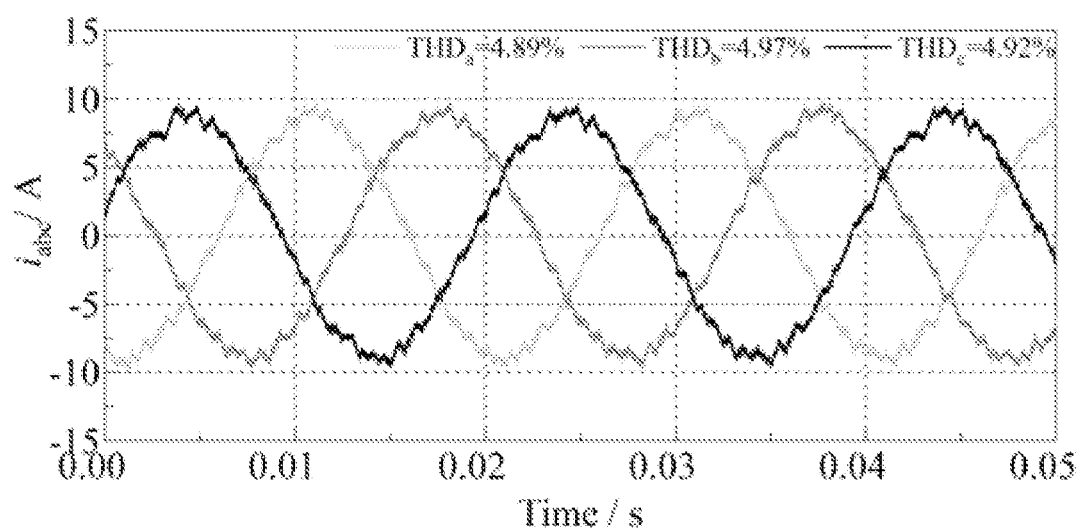
FIG. 6 (a) shows the experimental results of the line current at γ=0.2.
Figure 6B:
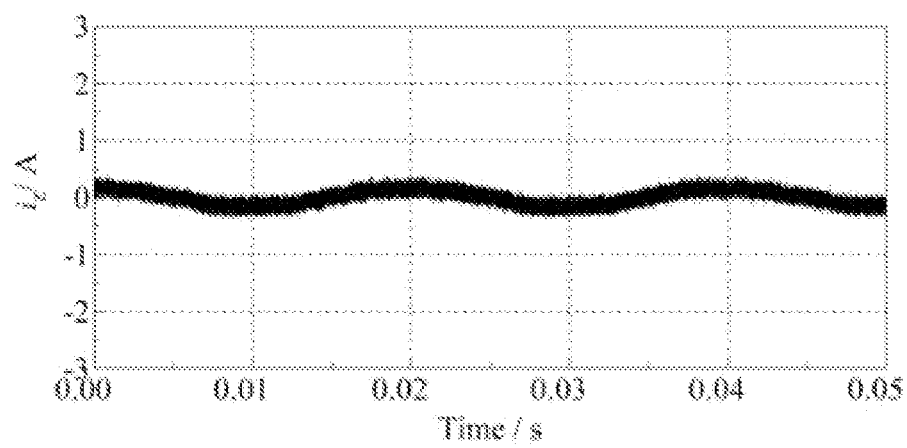
Figure 7A:
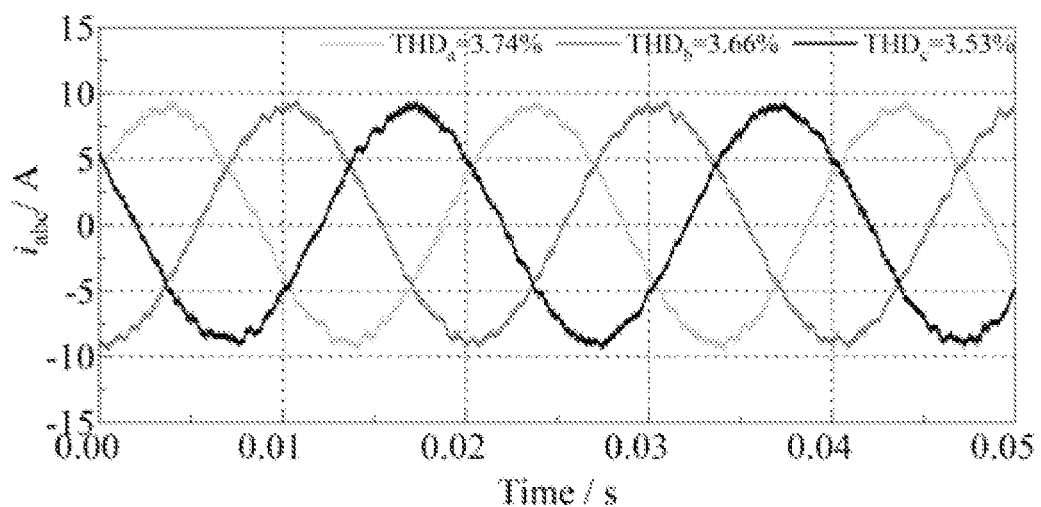
FIG. 7 (a) shows the experimental results of the line current at γ=0.5.
Figure 7B:
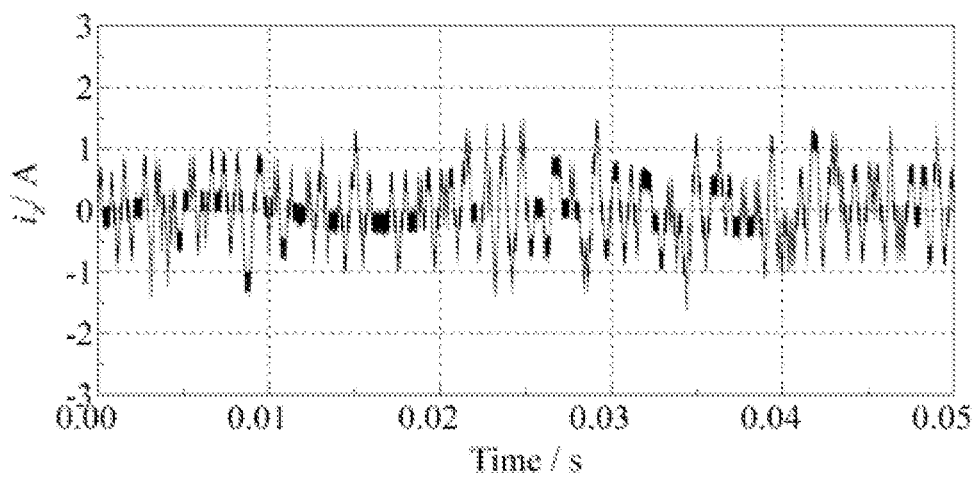
Figure 8A:
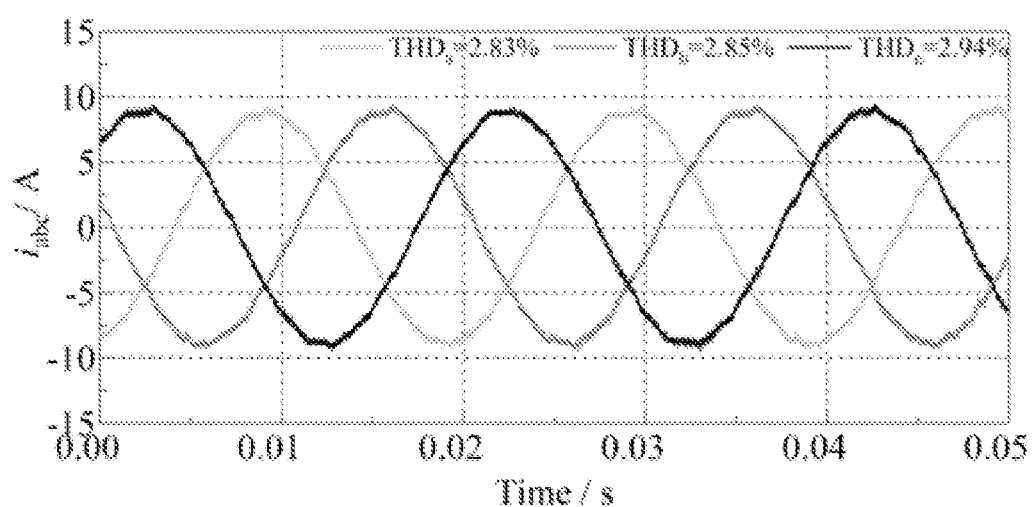
FIG. 8 (a) shows the experimental results of the line current at γ=0.8.
Figure 8B:
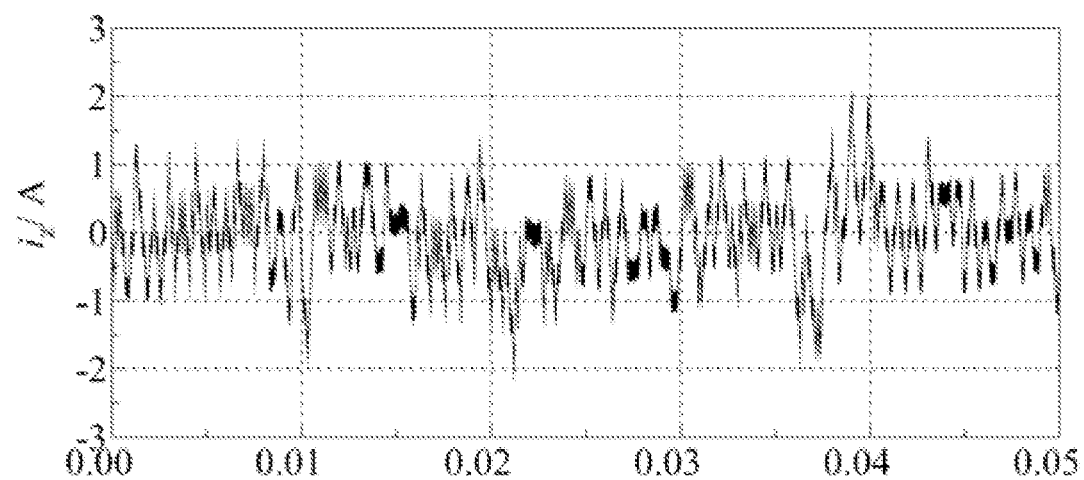

FIG. 6(a) and FIG. 6(b) demonstrate experimental results of line currents and three phase-circulating currents at $\gamma=0.2$, respectively, FIG. 7(a) and FIG. 7(b) illustrate experimental results of line currents and three phase-circulating currents at $\gamma=0.5$, respectively, and FIG. 8(a) and FIG. 8(b) depict the experimental results of line currents and three phase-circulating currents at $\gamma=0.8$, respectively. The figures indicate that all three experimental results achieved stable control of line currents and three phase-circulating currents with no instability of single-phase circulating currents. Additionally, the figures show that line current quality and circulating current have good performance at $\gamma=0.5$; when $\gamma=0.8$, line current performance improves at the cost of sacrificing circulating current performance; and when $\gamma=0.2$, circulating current performance improves at the cost of sacrificing line current performance.

This application uses centralized control to achieve precise control of two parallel power converters' overall performance. It establishes predictive models and a cost function to comprehensively control line currents and three phase-circulating currents. It proposes dynamic weight coefficients and adjustment principles to enhance comprehensive control performance. An output signal matrix with important characteristic information of all alternative vectors is constructed to reduce computation time. Delay compensation is considered to improve the system's control effects.

The above description of embodiments is a preferred embodiment of the application, but the embodiments of the application are not limited by the above embodiments. On the basis of the ideological principle and technical scheme of the application, various modifications or variants that can be made by those skilled in the art without creative work are still within the protection scope of the application.

What is claimed is:

1. A single vector-based finite control set model predictive control method of two parallel power converters, comprising:

establishing mathematical models of line currents and three phase-circulating currents for the two parallel power converters respectively, and obtaining discrete predictive models by discretization;

establishing relationships between switching states and equivalent output terminal voltage differences of the two parallel power converters, generating a complete set of 64 alternative vector combinations available with the two parallel power converters, and creating a finite set output signal matrix that comprises characteristic information covering switching states, equivalent output voltages, and terminal voltage differences;

sampling a DC bus voltage, load voltages, and three-phase currents of each converter at an instant k, determining the line currents and the three phase-circulating currents according to the three-phase currents of the two parallel power converters, and calculating reference values of the line currents at an instant k+2, while setting the reference values of the three phase-circulating currents to zero;

adding delay compensation, using a two-step prediction approach, classifying the 64 alternative vector combinations of the two parallel power converters, substituting the equivalent output voltages and the terminal voltage differences in the finite set output signal matrix into the discrete predictive models by category, and generating predictive values of the line currents and the three phase-circulating currents at the instant k+2;

creating a cost function using the line currents and the three phase-circulating currents as performance indices, substituting the reference values of the line currents and the predictive values of the line currents and the three phase-circulating currents of the alternative vector combinations at the instant k+2 to obtain a cost function value and obtaining an optimal vector combination that minimizes the cost function through comparison;

generating switching control signals of corresponding legs of the two parallel power converters through a comparator using switching states of the optimal vector combination and amplifying the switching control signals to control power switching devices of the two parallel power converters.

2. The single vector-based finite control set model predictive control method of two parallel power converters according to claim 1, wherein, the discrete predictive models of the line currents are:

$$\begin{cases} i_a(k+1) = \frac{T_s}{L_e}[u_a(k) - e_a(k) - R_e i_a(k)] + i_a(k) \\ i_b(k+1) = \frac{T_s}{L_e}[u_b(k) - e_b(k) - R_e i_b(k)] + i_b(k) \\ i_c(k+1) = \frac{T_s}{L_e}[u_c(k) - e_c(k) - R_e i_c(k)] + i_c(k) \end{cases},$$

where $T_s$ is a switching period; $L_e$ and $R_e$ represent an equivalent inductance and its parasitic resistance respectively; $L_e$ is calculated as $L_e=L+L_1/2$ and $R_e$ is calculated as $R_e=R+R_1/2$; $i_a(k)$, $i_b(k)$ and $i_c(k)$ are the line currents calculated at the instant k; $i_a(k+1)$, $i_b(k+1)$ and $i_c(k+1)$ are the predictive line currents at an instant k+1; $u_a(k)$, $u_b(k)$ and $u_c(k)$ are the equivalent output voltages at the instant k; $e_a(k)$, $e_b(k)$ and $e_c(k)$ are grid voltages at the instant k;

the discrete predictive models of the three phase-circulating currents are:

$$\begin{cases} i_{cira}(k+1) = \frac{T_s}{L_1}[\Delta u_a(k) - R_1 i_{cira}(k)] + i_{cira}(k) \\ i_{cirb}(k+1) = \frac{T_s}{L_1}[\Delta u_b(k) - R_1 i_{cirb}(k)] + i_{cirb}(k) \\ i_{circ}(k+1) = \frac{T_s}{L_1}[\Delta u_c(k) - R_1 i_{circ}(k)] + i_{circ}(k) \end{cases},$$

where $i_{cira}(k)$, $i_{cirb}(k)$ and $i_{circ}(k)$ are the three phase-circulating currents calculated at the instant k, $i_{cira}(k+)$, $i_{cirb}(k+1)$ and $i_{circ}(k+1)$ are predictive three phase-circulating currents at the instant k+1, and $\Delta u_a(k)$, $\Delta u_b(k)$ and $\Delta u_c(k)$ represent the terminal voltage differences between parallel legs at the instant k, respectively.

3. The single vector-based finite control set model predictive control method of two parallel power converters according to claim 1, wherein, the relationships between the switching states and the equivalent output voltages of the two parallel power converters are:

$$\begin{cases} u_a = \frac{2(S_{a1} + S_{a2}) - (S_{b1} + S_{b2}) - (S_{c1} + S_{c2})}{6} V_{DC} \\ u_b = \frac{2(S_{b1} + S_{b2}) - (S_{a1} + S_{a2}) - (S_{c1} + S_{c2})}{6} V_{DC} \\ u_c = \frac{2(S_{c1} + S_{c2}) - (S_{a1} + S_{a2}) - (S_{b1} + S_{b2})}{6} V_{DC} \end{cases},$$

where $S_{a1}$, $S_{b1}$, and $S_{c1}$ represent ON/OFF status of IGBTs of a first power converter, and $S_{a2}$, $S_{b2}$, and $S_{c2}$ represent ON/OFF status of IGBTs of a second power converter; all switching states only take a value of 1 or 0, taking 1 means that an upper IGBT is on and a lower IGBT is off, taking 0 means that the upper IGBT is off and the lower IGBT is on, and $V_{DC}$ is the DC bus voltage; the relationships between the switching states and the terminal voltage differences of the two parallel power converters are:

$$\begin{cases} \Delta u_a = (S_{a1} - S_{a2}) V_{DC} \\ \Delta u_b = (S_{b1} - S_{b2}) V_{DC} \\ \Delta u_c = (S_{c1} - S_{c2}) V_{DC} \end{cases}$$

the finite set output signal matrix is 64 rows×12 columns, whose rows are expressed as [$S_{a1}$ $S_{b1}$ $S_{c1}$ $S_{a2}$ $S_{b2}$ $S_{c2}$ $u_a$ $u_b$ $u_c$ $\Delta u_a$ $\Delta u_b$ $\Delta u_c$].

4. The single vector-based finite control set model predictive control method of two parallel power converters according to claim 1, wherein, the line currents and the three phase-circulating currents are determined according to the three-phase currents of the two parallel power converters as follows:

$$\begin{cases} i_a(k) = i_{a1}(k) + i_{a2}(k) \\ i_b(k) = i_{b1}(k) + i_{b2}(k) \\ i_c(k) = i_{c1}(k) + i_{c2}(k) \end{cases}, \text{ and } \begin{cases} i_{cira}(k) = i_{a1}(k) - i_{a2}(k) \\ i_{cirb}(k) = i_{b1}(k) - i_{b2}(k) \\ i_{circ}(k) = i_{c1}(k) - i_{c2}(k) \end{cases},$$

where $i_{a1}(k)$, $i_{b1}(k)$, $i_{c1}(k)$, $i_{a2}(k)$, $i_{b2}(k)$ and $i_{c2}(k)$ are respectively the three-phase currents of the two parallel power converters at the instant k, $i_{cira}(k)$, $i_{cirb}(k)$ and $i_{circ}(k)$ are the three phase-circulating currents calculated at the instant k, and $i_a(k)$, $i_b(k)$ and $i_c(k)$ are the line currents calculated at the instant k.

5. The single vector-based finite control set model predictive control method of two parallel power converters according to claim 1, wherein, the reference values of the line currents at the instant k+2 are:

$$\begin{cases} i_{ra}(k+2) = 3i_{ra}(k+1) - 3i_{ra}(k) + i_{ra}(k-1) \\ i_{rb}(k+2) = 3i_{rb}(k+1) - 3i_{rb}(k) + i_{rb}(k-1), \\ i_{rc}(k+2) = 3i_{rc}(k+1) - 3i_{rc}(k) + i_{rc}(k-1) \end{cases}$$

where $i_{ra}(k+2)$, $i_{rb}(k+2)$ and $i_{rc}(k+2)$ are the reference values of the line currents at the instant k+2.

6. The single vector-based finite control set model predictive control method of two parallel power converters according to claim 1, wherein, adding delay compensation, using a two-step prediction approach, classifying the 64 alternative vector combinations of the two parallel power converters comprises: substituting the load voltages, the line currents, and the three phase-circulating currents at the instant k, along with the equivalent output voltages and the terminal voltage differences determined by a preselection vector at an instant k−1, into the discrete predictive models to obtain the predictive values of the line currents and the three phase-circulating currents at an instant k+1; classifying the 64 alternative vector combinations: classifying different vector combinations with the same equivalent output terminal voltage differences into one group, wherein the vector combinations of a same group require only one predictive calculation, classifying the 64 alternative vector combinations into 5 groups according to different values of an a-phase equivalent output voltage $u_a$, wherein, 5 different values of $u_a$ are $2V_{DC}/3$, $V_{DC}/3$, 0, $-V_{DC}/3$ and $-2V_{DC}/3$ respectively; according to different values of an a-terminal voltage difference $\Delta u_a$ of the two parallel power converters, classifying the 64 alternative vector combinations into 3 groups, wherein, 3 different values of $\Delta u_a$ are $V_{DC}$, 0 and $-V_{DC}$ respectively, and $V_{DC}$ is the DC bus voltage; obtaining the predictive values of the line currents and the three phase-circulating currents at the instant k+2 corresponding to all alternative vectors based on classification.

7. The single vector-based finite control set model predictive control method of two parallel power converters according to claim 1, wherein, the cost function is:

$$g = \sum_{x=a,b,c} (i_{cirx}(k+2))^2 + \frac{1}{\lambda^2} \frac{\gamma}{1-\gamma} \left(\frac{L_e}{L_1}\right)^2 \sum_{x=a,b,c} (i_x(k+2) - i_{rx}(k+2))^2,$$

wherein, λ is a distribution coefficient determined based on a fluctuation amplitude analysis of the three phase-circulating currents and parallel current ripples; $V_{DC}$ is the DC bus voltage; $i_{cirx}(k+2)$ is an x-phase circulating current at the instant k+2, $i_x(k+2)$ is an x-phase parallel current at the instant k+2, $i_{rx}(k+2)$ is an x-phase reference current at the instant k+2; $L_e$ represents an equivalent inductance; $L_1$ represents a filter inductance of each converter; γ∈ [0,1] is a dynamic weight coefficient, in a case where distribution coefficient of two control objectives is determined by λ, γ=0.5 denotes that the three-phase circulating currents and the parallel current ripples have balanced control effect, to prioritize line current quality performance, increase γ; to prioritize circulating current performance, decrease γ.

8. The single vector-based finite control set model predictive control method of two parallel power converters according to claim 7, wherein, the distribution coefficient $$\lambda = \max\left(M, \frac{4}{3} - M\right), M = 2U_m/V_{DC}$$

is a modulation index and $U_m$ is an amplitude of the reference voltage.

9. An electronic device, comprising a memory, a processor and a computer program stored on the memory and capable of running on the processor, wherein, the processor implements the single vector-based finite control set model predictive control method of two parallel power converters according to claim 1 when executing the computer program.

10. A computer-readable storage medium, on which a computer program is stored, wherein, the computer program implements the single vector-based finite control set model predictive control method of two parallel power converters according to claim 1 when executed by the processor.

* * * * *